United States Patent
Komiya et al.

(10) Patent No.: US 10,594,518 B2
(45) Date of Patent: Mar. 17, 2020

(54) BIDIRECTIONAL TRANSMISSION SYSTEM

(71) Applicant: ROHM CO., LTD., Kyoto (JP)

(72) Inventors: Toshihide Komiya, Kyoto (JP); Kenya Nakamura, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 16/299,700

(22) Filed: Mar. 12, 2019

(65) Prior Publication Data
US 2019/0288879 A1    Sep. 19, 2019

(30) Foreign Application Priority Data

Mar. 14, 2018  (JP) ................. 2018-046511
Jan. 22, 2019  (JP) ................. 2019-008749

(51) Int. Cl.
*H04L 25/02*    (2006.01)
(52) U.S. Cl.
CPC ...... *H04L 25/0272* (2013.01); *H04L 25/0282* (2013.01); *H04L 25/0286* (2013.01); *H04L 25/0294* (2013.01)

(58) Field of Classification Search
CPC ............ H04L 25/0272; H04L 25/0282; H04L 25/0294; H04L 25/0286
See application file for complete search history.

(56) References Cited

U.S. PATENT DOCUMENTS

| | | | | |
|---|---|---|---|---|
| 2009/0257514 A1* | 10/2009 | Connolly | ................. | H04B 3/04 375/257 |
| 2009/0304054 A1* | 12/2009 | Tonietto | ................. | H04L 1/205 375/221 |
| 2012/0216084 A1* | 8/2012 | Chun | ..................... | H04L 25/02 714/708 |

FOREIGN PATENT DOCUMENTS

WO    2008099523 A1    8/2008

* cited by examiner

*Primary Examiner* — Vineeta S Panwalkar
(74) *Attorney, Agent, or Firm* — Cantor Colburn LLP

(57) ABSTRACT

A first receiver receives second serial data transmitted from a second circuit. A second receiver receives first serial data transmitted from a first circuit. An automatic adjustment circuit generates a control signal so as to reduce an error rate of the first serial data received by the second receiver. A second driver drives a differential transmission path according to the second serial data including the control signal. An operation parameter of a first driver is set based on the control signal included in the second serial data.

18 Claims, 6 Drawing Sheets

BIDIRECTIONAL TRANSMISSION SYSTEM

CROSS REFERENCE TO RELATED APPLICATIONS

The present application claims priority under 35 U.S.C. § 119 to Japanese Patent Application No. 2018-046511, filed on Mar. 14, 2018 and Japanese Application No. 2019-008749, filed on Jan. 22, 2019, is incorporated herein by reference in its entirety.

BACKGROUND OF THE INVENTION

1. Field of the Invention

The present invention relates to a bidirectional transmission technique.

2. Description of the Related Art

In order to support high-speed data transmission between multiple semiconductor devices, a differential serial interface is widely employed. In particular, with a clockless transmission method employing a CDR (Clock Data Recovery) method, by transmitting serial data including embedded clock data, this arrangement supports such high-speed data transmission using a single differential line.

Applications of such a differential serial interface are seen to be expanding. For example, such a differential serial interface is employed to support data transmission between in-vehicle devices included in a vehicle. An AC-coupling interface is disclosed in Patent document 1 (International Publication WO 2008/099523) that requires only a single transmission path to support bidirectional transmission.

In some cases, transmission distances between such in-vehicle devices are over 5 m or more. In such long-distance transmission, there are non-negligible effects of low-pass filters that occur due to parasitic resistances and parasitic capacitances in the transmission path, and the high-frequency component of the transmitted serial signal is attenuated. Accordingly, distortion of the waveform observed on a receiver side becomes conspicuous. In order to solve such a problem of waveform distortion that occurs in the transmission path, a pre-emphasis circuit is introduced on the transmission side. On the transmission side, the pre-emphasis circuit emphasizes the high-frequency components that are attenuated in the transmission path.

The operation parameters of the pre-emphasis circuit are required to be optimized according to the characteristics of the transmission path. It is difficult to apply pre-emphasis settings optimized for a given transmission path to another transmission path. Accordingly, the designer of a set (platform) on which a differential serial interface is to be mounted is required to adjust the settings of a pre-emphasis circuit for each set according to the characteristics of a substrate or a cable. Such adjustment cannot be made in a simple manner. This becomes a cause of an increased design period required to design a set and a cause of increased costs.

SUMMARY OF THE INVENTION

The present invention has been made in view of such a situation. Accordingly, it is an exemplary purpose of an embodiment of the present invention to provide a bidirectional transmission system that is capable of automatically optimizing the circuit operation parameters.

An embodiment of the present invention relates to a bidirectional transmission system. The bidirectional transmission system comprises a first circuit and a second circuit coupled via a differential transmission path. The first circuit comprises: a first driver coupled to one end of the differential transmission path and structured to drive the differential transmission path according to first serial data; a first receiver coupled to the one end of the differential transmission path and structured to receive second serial data transmitted from the second circuit; and a controller structured to set an operation parameter of the first driver based on a control signal included in the second serial data. The second circuit comprises: a second receiver coupled to the other end of the differential transmission path, and structured to receive the first serial data transmitted from the first circuit; an automatic adjustment circuit structured to generate the control signal so as to reduce an error rate of the first serial data received by the second receiver; and a second driver coupled to the other end of the differential transmission path, and structured to drive the differential transmission path according to the second serial data including the control signal.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Overview of the Embodiments

Figure 1:
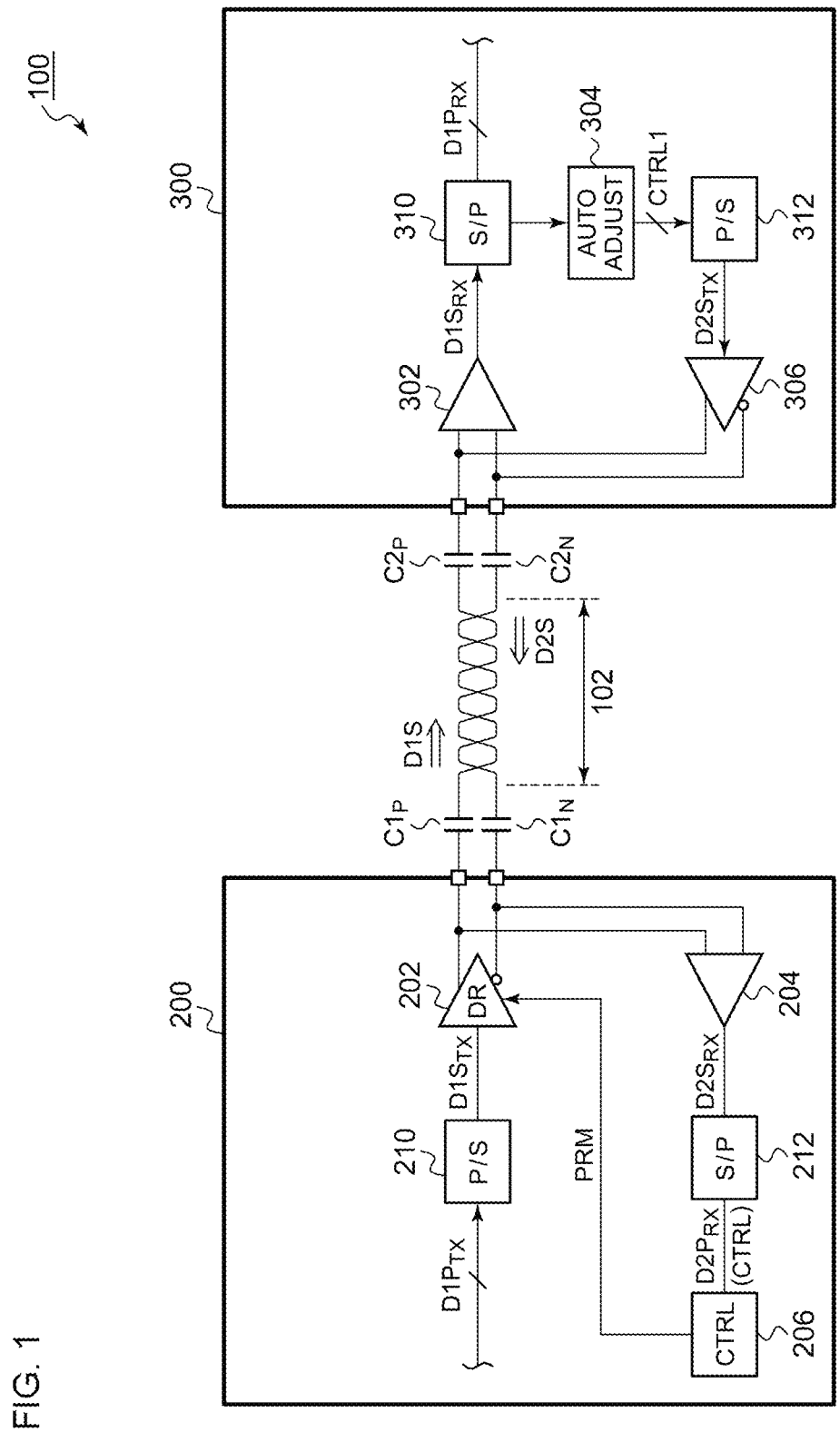
FIG. 1 is a block diagram showing a bidirectional transmission system according to an embodiment.

An embodiment disclosed in the present specification relates to a bidirectional transmission system. The bidirectional transmission system comprises a first circuit and a second circuit coupled via a differential transmission path. The first circuit comprises: a first driver coupled to one end of the differential transmission path and structured to drive the differential transmission path according to first serial data; a first receiver coupled to the one end of the differential transmission path and structured to receive second serial data transmitted from the second circuit; and a controller structured to set an operation parameter of the first driver based on a control signal included in the second serial data. The second circuit comprises: a second receiver coupled to the other end of the differential transmission path, and structured to receive the first serial data transmitted from the first circuit; an automatic adjustment circuit structured to generate the control signal so as to reduce an error rate of the first serial data received by the second receiver; and a second driver coupled to the other end of the differential transmission path, and structured to drive the differential transmission path according to the second serial data including the control signal.

With this embodiment, the second circuit monitors the error rate of the received first serial data, and feeds back a control signal to the first circuit so as to reduce the error rate. This arrangement is capable of automatically optimizing the operation parameters of the first driver.

It should be noted that, typically, the error rate represents a ratio of the number of code errors (error bits or error symbols) with respect to the total number of codes (bits or symbols). However, in the present specification, the error rate represents a broader definition. That is to say, an index that represents the communication quality will be broadly referred to collectively as the error rate. For example, in a case in which the total number of codes transmitted in a predetermined period of time is constant, the number of the code errors may be employed as the error rate.

Also, the first driver may be structured to adjust an amplitude of a signal to be transmitted via the differential transmission path. Also, the control signal may include data for controlling the amplitude. This allows the amplitude of the differential signal to be optimized according to the state of the transmission line, thereby improving the error rate.

Also, the first driver may be structured to have a pre-emphasis function, and to be capable of adjusting at least one from among a pre-emphasis value and a waveform. Also, the control signal may include data for controlling the pre-emphasis function. This allows the parameter for the pre-emphasis function to be optimized according to the state of the transmission line, thereby improving the error rate.

Also, the first driver may be structured to have a de-emphasis function, and to be capable of adjusting at least one from among a de-emphasis value and a waveform. Also, the control signal may include data for controlling the de-emphasis function. This allows the parameter for the de-emphasis function to be optimized according to the state of the transmission line, thereby improving the error rate.

Also, the second receiver may be structured to have an equalization function. Also, the automatic adjustment circuit may adjust the equalization function of the second receiver so as to reduce an error rate of the first serial data received by the second receiver. This allows the parameter for the equalization function to be optimized according to the state of the transmission line, thereby improving the error rate.

Also, after the equalization function is adjusted, the automatic adjustment circuit may adjust the operation parameter of the first driver of the first circuit according to the control signal.

Also, the first serial data may be encoded by means of the first circuit with a predetermined method. Also, when the received first serial data does not match any valid symbol, the automatic adjustment circuit may judge this as an error. This allows error detection independent of the value of the serial data to be transmitted. Also, the predetermined method may be 8b/10b encoding.

Another embodiment disclosed in the present specification relates to a serializer circuit coupled to a deserializer circuit via a differential transmission path so as to form a bidirectional transmission system. The deserializer circuit comprises: a second receiver coupled to one end of the differential transmission path, and structured to receive first serial data transmitted from the serializer circuit; an automatic adjustment circuit structured to generate a control signal so as to reduce an error rate of the first serial data received by the second receiver; and a second driver coupled to the one end of the differential transmission path, and structured to drive the differential transmission path according to second serial data including the control signal. The serializer circuit comprises: a first driver coupled to the other end of the differential transmission path, and structured to drive the differential transmission path according to the first serial data; a first receiver coupled to the other end of the differential transmission path, and structured to receive the second serial data transmitted from the deserializer circuit; and a controller structured to set an operation parameter of the first driver based on the control signal included in the second serial data.

Yet another embodiment disclosed in the present specification relates to a deserializer circuit coupled to a serializer circuit via a differential transmission path so as to form a bidirectional transmission system. The serializer circuit comprises: a first driver coupled to one end of the differential transmission path, and structured to drive the differential transmission path according to first serial data; a first receiver coupled to the one end of the differential transmission path, and structured to receive second serial data transmitted from the deserializer circuit; and a controller structured to set an operation parameter of the first driver based on a control signal included in the second serial data. The deserializer circuit comprises: a second receiver coupled to the other end of the differential transmission path, and structured to receive the first serial data transmitted from the serializer circuit; an automatic adjustment circuit structured to generate a control signal so as to reduce an error rate of the first serial data received by the second receiver; and a second driver coupled to the other end of the differential transmission path, and structured to drive the differential transmission path according to the second serial data including the control signal.

Also, the predetermined method may be 8b/10b encoding.

Yet another embodiment disclosed in the present specification relates to a vehicle. The vehicle may comprise a camera, a processor, and the bidirectional transmission system described above, provided between the camera and the processor.

EMBODIMENTS

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

Configuration of Bidirectional Transmission System 100

FIG. 1 is a block diagram showing a bidirectional transmission system 100 according to an embodiment. The bidirectional transmission system 100 includes a first circuit 200 and a second circuit 300 coupled to each other via a differential transmission path 102. The first circuit 200 is coupled to a corresponding one end of the differential transmission path 102 via capacitors $C1_P$ and $C1_N$. The second circuit 300 is coupled to a corresponding one end of the differential transmission path 102 via capacitors $C2_P$ and $C2_N$.

Bidirectional serial transmission is supported between the first circuit 200 and the second circuit 300. There may be a difference in the transmission rate between transmission from the first circuit 200 to the second circuit 300 and transmission from the second circuit 300 to the first circuit 200. For example, large-volume data such as image data is transmitted from the first circuit 200 to the second circuit 300 at several Gbps. On the other hand, control data for controlling the first circuit 200 or other circuits coupled to the first circuit 200 is transmitted from the second circuit 300 to the first circuit 200 at several dozen Mbps.

Configuration of First Circuit 200

The first circuit 200 includes a first driver 202, a first receiver 204, a controller 206, a parallel/serial converter 210, and a serial/parallel converter 212.

An internal component (or otherwise an external component) of the first circuit 200 generates first parallel data $D1P_{TX}$ to be transmitted to the second circuit 300. The content of the first parallel data $D1P_{TX}$ is not restricted in particular. Examples of the content of the first parallel data $D1P_{TX}$ include image data, audio data, and other kinds of data. The parallel/serial converter 210 converts the first parallel data $D1P_{TX}$ into first serial data $D1S_{TX}$. The first driver 202 is AC coupled to one end of the differential transmission path 102 via a capacitor. The first driver 202 drives the differential transmission path 102 according to the first serial data $D1S_{TX}$. As a result, the first serial data D1S is transmitted from the first circuit 200 to the second circuit 300.

Furthermore, second serial data D2S is transmitted from the second circuit 300 to the first circuit 200. The first receiver 204 is coupled to one end of the differential transmission path 102. The first receiver 204 receives the second serial data D2S transmitted from the second circuit 300.

The controller 206 sets an operation parameter PRM of the first driver 202 based on a control signal CTRL1 included in the second serial data D2S. Specifically, the received second serial data $D2S_{RX}$ may be converted by the serial/parallel converter 212 into second parallel data $D2P_{RX}$, and the control signal CTRL1 may be extracted from the second parallel data $D2P_{RX}$. The above is the configuration of the first circuit 200.

Configuration of Second Circuit 300

Next, description will be made regarding a configuration of the second circuit 300. The second circuit 300 includes a second receiver 302, an automatic adjustment circuit 304, a second driver 306, a serial/parallel converter 310, and a parallel/serial converter 312.

The second receiver 302 is coupled to the other end of the differential transmission path 102. The second receiver 302 receives the first serial data D1S transmitted from the first circuit 200. The serial/parallel converter 310 converts the first serial data $D1S_{RX}$ received by the second receiver 302 into first parallel data $D1P_{RX}$. The first parallel data $D1P_{RX}$ is supplied to an unshown circuit block.

The automatic adjustment circuit 304 monitors the first serial data $D1S_{RX}$ received by the second receiver 302, and generates the control signal CTRL1 so as to reduce an error rate thereof.

The parallel/serial converter 312 receives the control signal CTRL1, and converts the control signal CTRL1 into second serial data $D2S_{TX}$ including the control signal CTRL1. The second driver 306 is coupled to the other end of the differential transmission path 102. The second driver 306 drives the differential transmission path 102 according to the second serial data $D2S_{TX}$ including the control signal CTRL1. The above is the configuration of the second circuit 300.

Operation of Bidirectional Transmission System 100

Figure 2:
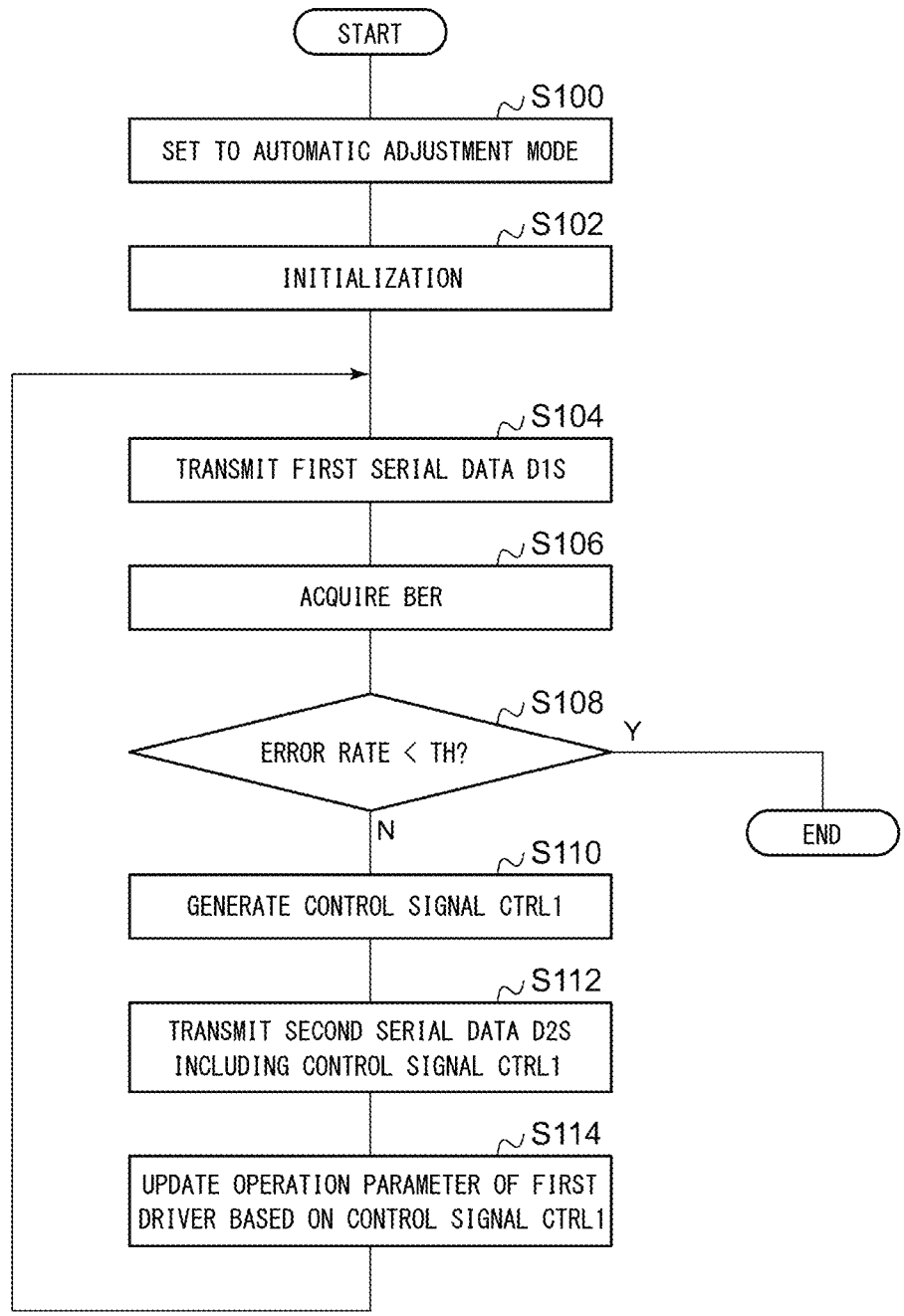
FIG. 2 is a flowchart for explaining the operation of the bidirectional transmission system shown in FIG. 1.

FIG. 2 is a flowchart for explaining the operation of the bidirectional transmission system 100 shown in FIG. 1. After the bidirectional transmission system 100 is started up, the bidirectional transmission system 100 is set to an automatic adjustment mode (S100). In this mode, the parameters of the first circuit 200 and the second circuit 300 are initialized.

The first circuit 200 transmits the first serial data $D1S_{TX}$ to the second circuit 300 (S104). This transmission is generated over a given period of time. The first serial data $D1S_{TX}$ may be generated as serial data into which an automatic adjustment data sequence generated by the controller 206 is converted by the parallel/serial converter 210.

In the second circuit 300, the automatic adjustment circuit 304 acquires the error rate ER of the first serial data $D1S_{RX}$ received by the second receiver 302 (S106).

The automatic adjustment circuit 304 compares the error rate ER with an allowable threshold value TH (S108). When the error rate ER is lower than the threshold value TH (YES in S108), the automatic adjustment mode ends (S110). Conversely, when the error rate ER is higher than the threshold value TH (NO in S108), the automatic adjustment circuit 304 generates the control signal CTRL1 (S110).

The second serial data D2S including the control signal CTRL1 is transmitted from the second circuit 300 to the first circuit 200 (S112). The first circuit 200 updates the operation parameter of the first driver 202 based on the control signal CTRL1 included in the second serial data D2S thus received (S112). Subsequently, the flow returns to Step S104.

Figure 3:
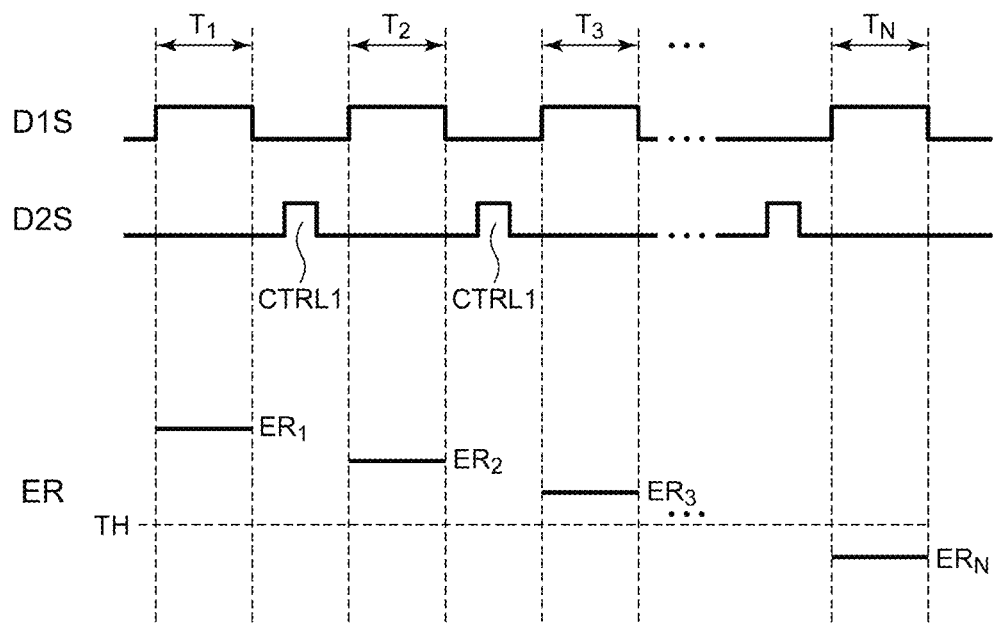
FIG. 3 is a time chart showing the operation of the bidirectional transmission system shown in FIG. 1.

FIG. 3 is a time chart showing the operation of the bidirectional transmission system 100 shown in FIG. 1. In a first transmission period $T_1$, the first serial data D1S is transmitted, and the error rate $ER_1$ of this period is measured. The error rate $ER_1$ in this measurement is higher than the threshold value TH. Accordingly, a new control signal CTRL1 is fed back from the second circuit 300 to the first circuit 200. As a result, the operation parameter of the first driver 202 is changed.

Subsequently, in the second transmission period $T_2$, the first serial data D1S is transmitted again, and the error rate $ER_2$ of this period is measured. The error rate $ER_2$ thus measured is also higher than the threshold value TH. Accordingly, a new control signal CTRL1 is fed back from the second circuit 300 to the first circuit 200. As a result, the operation parameter of the first driver 202 is further changed.

By repeating this operation, the error rate ER is gradually lowered. When the error rate ER in the N-th transmission period $T_N$ becomes lower than the threshold value TH, the automatic adjustment is completed. After the completion of the automatic adjustment, the operation parameter thus acquired is held in the memory. Subsequently, the operation mode is switched to the normal transmission mode.

The above is the operation of the bidirectional transmission system 100. With the bidirectional transmission system 100, by monitoring the error rate of the received first serial data $D1S_{RX}$ by means of the second circuit 300, and by feeding back the control signal CTRL1 to the first circuit 200 so as to lower the error rate, this arrangement is capable of automatically optimizing the operation parameter of the first driver 202. This allows the designer of the set to be freed from a trial-and-error operation for optimizing the parameter.

Operation Parameters of the Driver

Figure 4:
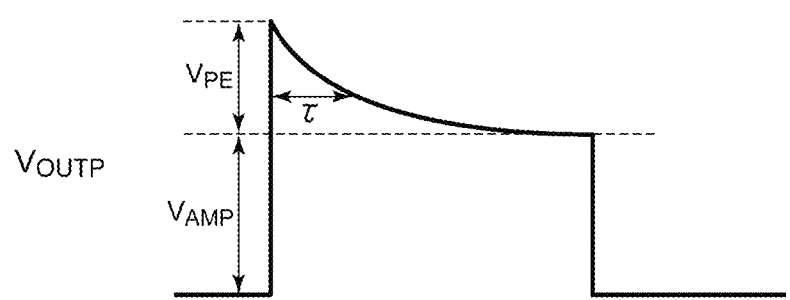
FIG. 4 is a diagram for explaining an operation parameter of the first driver.

FIG. 4 is a diagram for explaining the operation parameters of the first driver 202. FIG. 4 shows an output waveform (non-inverting output $V_{OUTP}$) of the first driver 202.

The first driver 202 is configured to be capable of adjusting the amplitude $V_{AMP}$ of a differential signal to be transmitted via the differential transmission path 102. One of the operation parameters of the first driver 202 is the amplitude $V_{AMP}$. The control signal CTRL1 includes first data for controlling the amplitude. The first data may be configured as multi-level data that defines the amplitude level $V_{AMP}$. Alternatively, the first data may be configured as binary data indicating raising or lowering the present amplitude level $V_{AMP}$.

Furthermore, the first driver 202 has a pre-emphasis function. One of the operation parameters of the first driver 202 may be configured as a pre-emphasis value $V_{PE}$. The control signal CTRL1 includes second data for controlling the pre-emphasis value $V_{PE}$. Also, one of the operation parameters of the first driver 202 may be configured as a pre-emphasis PE waveform. Examples of such a parameter for defining the waveform include the time constant $\tau$. The control signal CTRL1 may include third data for controlling the time constant $\tau$.

In an example, first, the automatic adjustment circuit 304 may gradually raise the amplitude $V_{AMP}$ from the initial value while fixing the pre-emphasis parameters ($V_{PE}$, $\tau$). When the error rate ER is higher than the threshold value TH after the amplitude $V_{AMP}$ reaches a given value, the automatic adjustment circuit 304 may fix the amplitude $V_{AMP}$ in this state, and may raise one from among the pre-emphasis parameters (e.g., pre-emphasis value $V_{PE}$). Subsequently, when the error rate ER is higher than the threshold value TH after the pre-emphasis value $V_{PE}$ reaches a given value, the automatic adjustment circuit 304 may fix the pre-emphasis value $V_{PE}$ in this state, and may change the remaining parameter (time constant $\tau$).

It should be noted that the method used in the automatic adjustment circuit 304 for optimizing the operation parameters is not restricted in particular. Rather, known optimal solution search algorithms may be employed, examples of which include the hill-climbing method.

Detection of Error Rate

In the first circuit 200, the first serial data D1S is encoded using a predetermined method. When the received first serial data $D1S_{RX}$ does not match a valid symbol, the automatic adjustment circuit 304 may judge that the received data is an error. For example, the data may be encoded using 8b10b encoding. In this case, 8-bit data of 00h to FFh are respectively represented by 32 symbols D00.0 through D31.7. When the data received by the receiver side does not match any one of D00.0 through D31.7, the automatic adjustment circuit 304 may judge that the received data is an error. In this method, this arrangement allows error detection independent of the transmitted 8-bit data.

Modification 1

Figure 5:
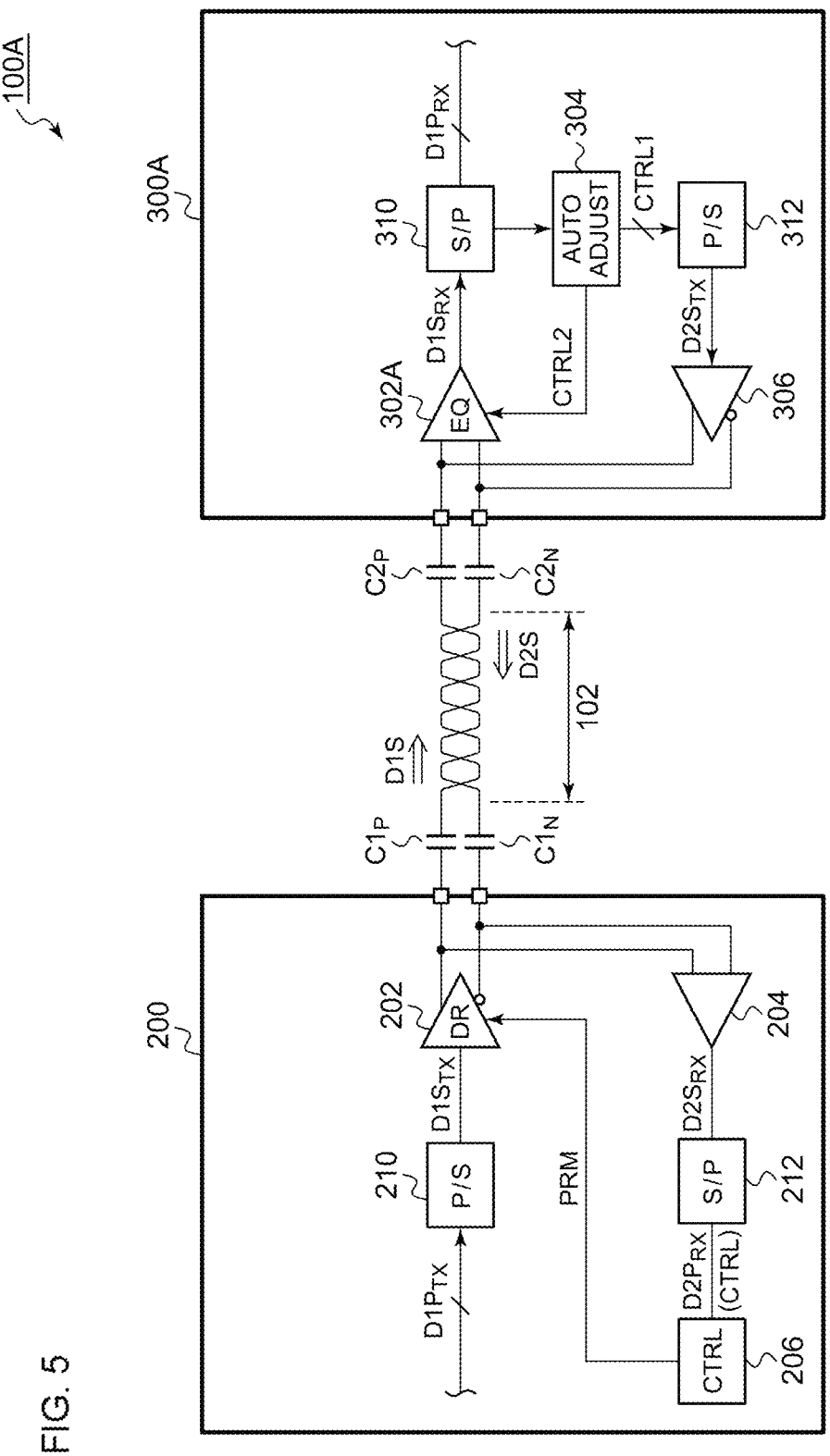
FIG. 5 is a block diagram showing a bidirectional transmission system according to a modification 1.

FIG. 5 is a block diagram showing a bidirectional transmission system 100A according to a modification 1. In this modification, a second receiver 302A of a second circuit 300A has an equalizing function. The parameters of the equalizing function can be controlled according to a control signal CTRL2. An automatic adjustment circuit 304A optimizes the control signal CTRL2 in addition to optimizing the control signal CTRL1 so as to lower the error rate.

In the modification 1, the automatic adjustment circuit 304 may change the equalizer parameters of the second receiver 302A. Subsequently, when the error rate is higher than the threshold value, the automatic adjustment circuit 304 may change the operation parameters of the first driver 202.

Usage

Figure 6:
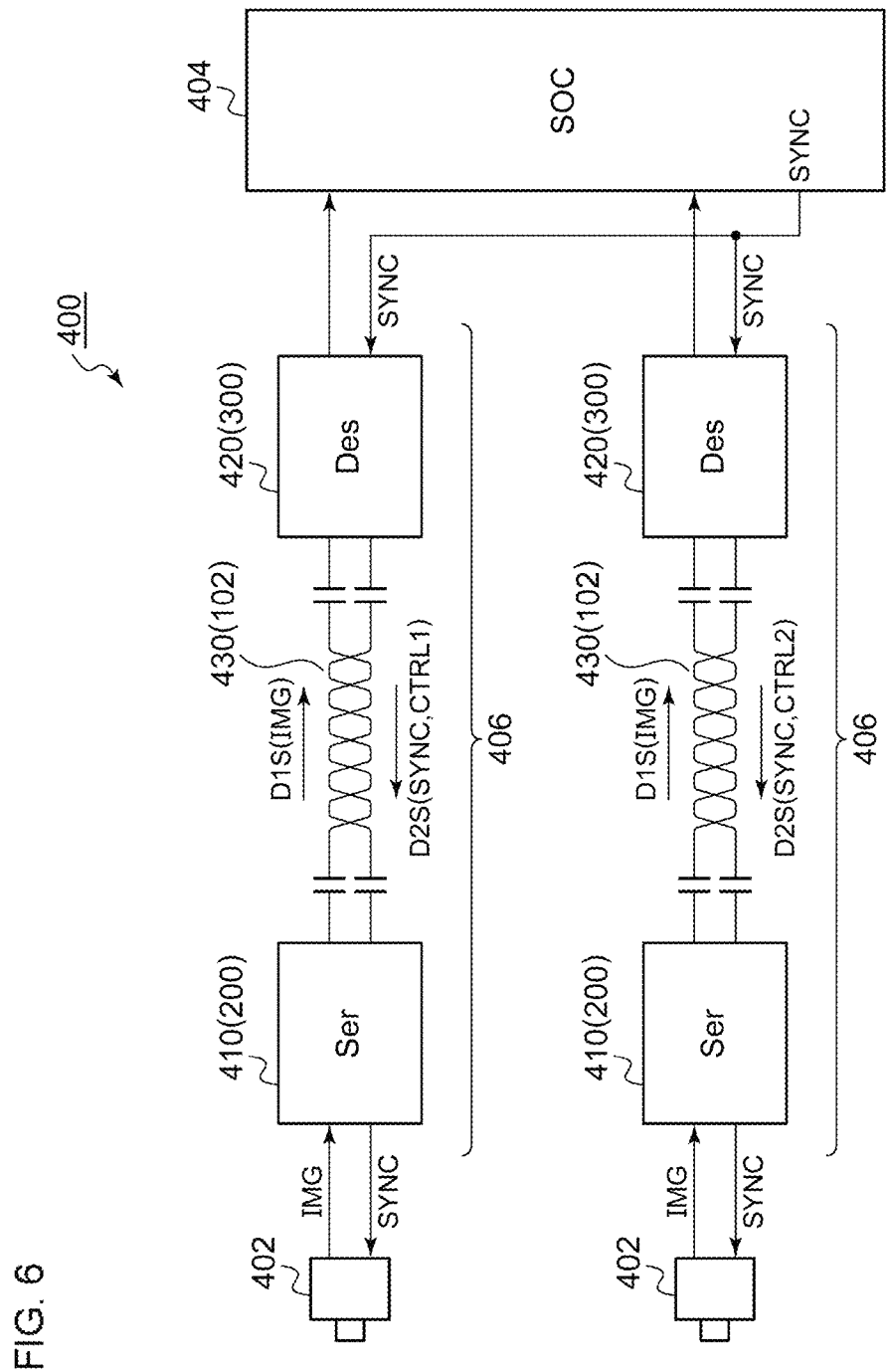
FIG. 6 is a block diagram showing an image processing system including the bidirectional transmission system.

Next, description will be made regarding the usage of the bidirectional transmission system 100. FIG. 6 is a block diagram showing an image processing system 400 including the bidirectional transmission system 100.

The image processing system 400 includes multiple cameras 402 and an SOC (System on Chip) 404. The SOC 404 performs predetermined image processing on image data IMG acquired by the multiple cameras 402. Furthermore, the SOC 404 supplies a signal (camera control signal) to the multiple cameras 402 so as to control the multiple cameras 402. For example, the image acquisition timing of the multiple cameras 402 is synchronized based on a synchronization signal SYNC, which is one of the camera control signals. FIG. 6 shows an arrangement including two cameras. The number of the cameras 402 mounted on the image processing system 400 may be greater than two. Also, only a single camera may be mounted on the image processing system 400.

In a case in which the distance between the cameras 402 and the SOC 404 is large, it is difficult for an interface circuit built into each camera 402 to accurately transmit the image data IMG to the SOC 404. On the other hand, it is difficult for an interface circuit built into the SOC 404 to accurately transmit a camera control signal to each camera 402. In such a usage, the above-described bidirectional transmission system 100 is preferably employed.

A bidirectional transmission system 406 is provided between each camera 402 and the SOC 404. The bidirectional transmission system 406 is configured using an architecture of the above-described bidirectional transmission system 100. The bidirectional transmission system 406 transmits, as the first serial data D1S, the image data IMG received from the camera 402 to the SOC 404. Furthermore, the bidirectional transmission system 100 transmits the second serial data D2S including the synchronization signal SYNC to the camera 402.

The bidirectional transmission system 406 includes a serializer circuit 410, a deserializer circuit 420, and a differential transmission path 430. The serializer circuit 410 corresponds to the first circuit 200. The deserializer circuit 420 corresponds to the second circuit 300. The differential transmission path 430 corresponds to the differential transmission path 102.

In the normal operation mode, the serializer circuit 410 receives the image data IMG from the camera 402, converts the image data IMG into the first serial data D1S, and transmits the first serial data D1S to the deserializer circuit 420. The deserializer circuit 420 receives the first serial data D1S, and supplies the image data IMG to the SOC 404.

Furthermore, in the normal operation mode, the deserializer circuit 420 receives the camera control signal (synchronization signal SYNC) from the SOC 404, converts the camera control signal thus received into the second serial data D2S, and transmits the second serial data D2S to the serializer circuit 410.

After the image processing system 400 is started up, before the operation mode is switched to the normal operation mode, the operation mode is set to the automatic adjustment mode. In the automatic adjustment mode, it is not necessary to employ the image data IMG as the first serial data D1S. In the automatic adjustment mode, the second serial data D2S includes the control signal CTRL1 so as to optimize the operation parameters of the first driver 202 built into the serializer circuit 410 (first circuit 200).

Figure 7:
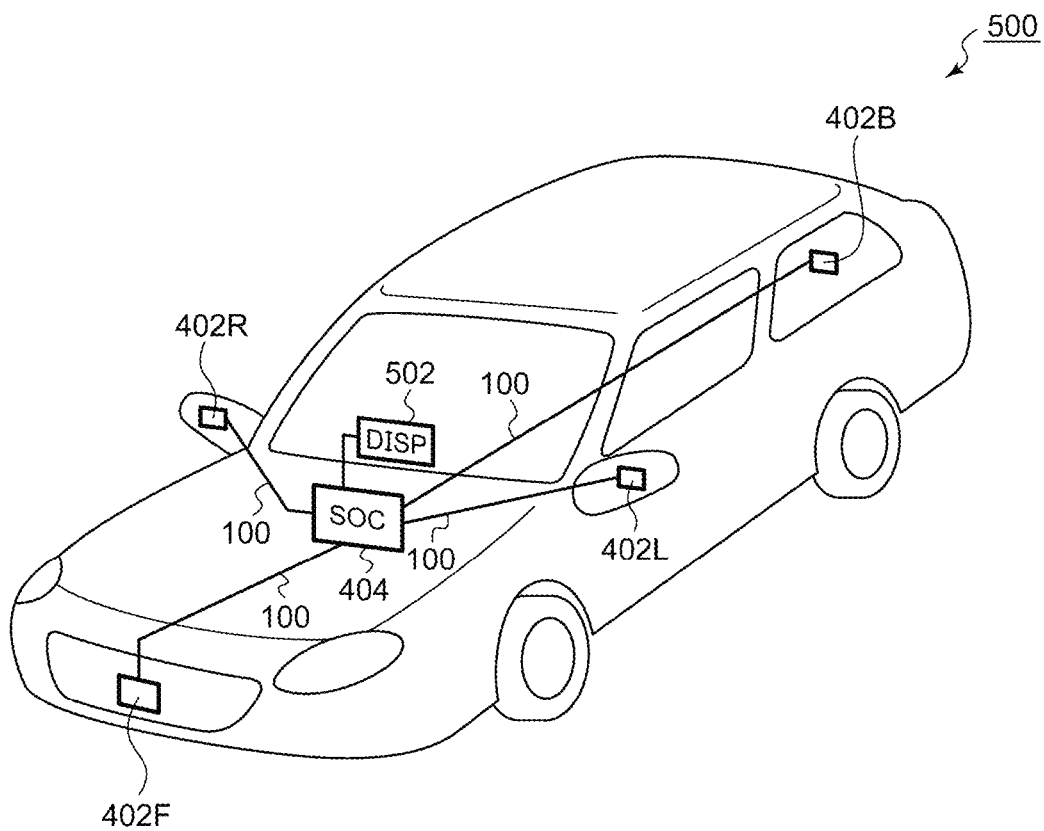
FIG. 7 is a diagram showing a vehicle including the image processing system shown in FIG. 6.

FIG. 7 is a diagram showing a vehicle including the image processing system 400 shown in FIG. 6. A vehicle 500 includes multiple cameras 402. Each camera 402 is coupled to the SOC 404 via the bidirectional transmission system 406. For example, the SOC 404 controls the multiple cameras 402 based on the driving state of the vehicle 500, and processes the image data received from the cameras 402. For example, in the reverse driving mode, the SOC 404 enables a rear camera 402B, and displays the image received from the rear camera 402B on an in-vehicle display 502. Upon selecting an around-view monitoring mode in parking, the SOC 404 enables the multiple cameras 402, combines the multiple images received from the multiple cameras 402 so as to generate a composite image, and displays the composite image on the in-vehicle display 502.

Description has been made above regarding the present invention with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Deemphasis Function

Description has been made in the embodiment regarding an arrangement in which the first driver 202 has a pre-emphasis function. However, the present invention is not restricted to such an arrangement. Also, a de-emphasis function may be provided. In this case, de-emphasis operation parameters may be changed according to the control signal CTRL1.

Error Detection

The error detection method is not restricted to such a method using 8b10b encoding. For example, in the automatic adjustment mode, the first circuit 200 may transmit a predetermined bit sequence as the first serial data D1S. For example, a reproducible pseudo random binary sequence (PRBS) signal may be employed. The first circuit 200 may judge whether or not the bit sequence thus received matches its expected value so as to support error detection.

Operation Parameters of the First Driver

Figure 8:
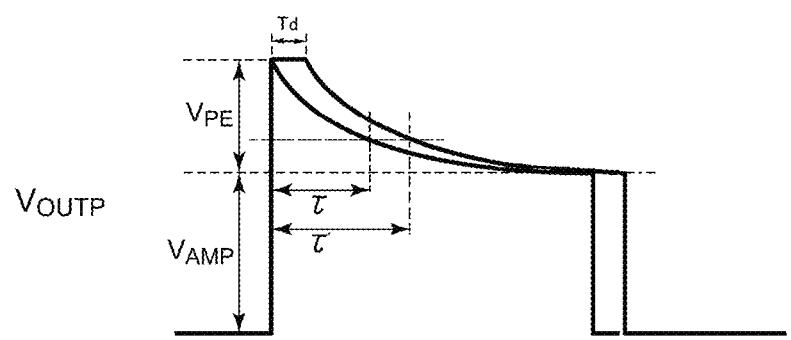
FIG. 8 is a diagram for explaining another operation parameter of the first driver.

FIG. 4 shows an example in which the time constant $\tau$ is employed as a parameter that defines the waveform of the first driver. However, the present invention is not restricted to such an example. FIG. 8 is a diagram for explaining another operation parameter of the first driver. With the output voltage $V_{OUTP}$ of the first driver, the period Td for which the peak level ($V_{AMP}+V_{PE}$) is maintained is adjustable. The adjustable period Td may be employed as an operation parameter. That is to say, the waveform of the output voltage $V_{OUTP}$ is variable. This arrangement is capable of adjusting the effective time constant $\tau'$ required for the output voltage $V_{OUTP}$ to decay to a predetermined voltage level. The control signal CTRL1 may include third data for controlling the peak hold time Td. With this modification, the circuit configuration may be designed in a simple manner as compared with an arrangement in which the time constant $\tau$ is changed.

Optimization of Operation Parameters

Various modifications may be made for a method for optimizing the operation parameters. For example, in order to optimize the operation parameter shown in FIG. 8, the following operation may be performed.

First, the automatic adjustment circuit 304 initializes the multiple parameters ($V_{PE}$, $V_{AMP}$, Td). In this state, BER is measured. The automatic adjustment circuit 304 compares the BER thus measured with a threshold value so as to make a "pass/fail" judgement. When a "pass" judgement has been made, the operation ends.

When a "fail" judgment has been made, one from among the multiple parameters (e.g., $V_{AMP}$) is changed by one step. In this state, when a "pass" judgement has been made, the operation ends. When a "pass" judgement has not been made, i.e., before a "pass" judgement is made, the other parameters, i.e., Td and $V_{PE}$, are alternately changed in a stepwise manner. When a "pass" judgement has not been made after the parameters $V_{PE}$ and Td are each changed by a predetermined number of steps, the parameter $V_{AMP}$ is further changed by one step. In this state, before a "pass" judgement is made, the parameters $V_{PE}$ and Td are alternately changed in a stepwise manner. This operation is repeatedly performed before the parameter $V_{AMP}$ is changed by a predetermined number of steps.

While the preferred embodiments of the present invention have been described using specific terms, such description is for illustrative purposes only, and it is to be understood that changes and variations may be made without departing from the spirit or scope of the appended claims.

What is claimed is:

1. A bidirectional transmission system comprising a first circuit and a second circuit coupled via a differential transmission path,
   wherein the first circuit comprises:
   a first driver coupled to one end of the differential transmission path and structured to drive the differential transmission path according to first serial data;
   a first receiver coupled to the one end of the differential transmission path and structured to receive second serial data transmitted from the second circuit; and
   a controller structured to set an operation parameter of the first driver based on a control signal included in the second serial data,
   and wherein the second circuit comprises:
   a second receiver coupled to the other end of the differential transmission path, and structured to receive the first serial data transmitted from the first circuit;
   an automatic adjustment circuit structured to generate the control signal so as to reduce an error rate of the first serial data received by the second receiver; and
   a second driver coupled to the other end of the differential transmission path, and structured to drive the differential transmission path according to the second serial data including the control signal.

2. The bidirectional transmission system according to claim 1, wherein the first driver is structured to adjust an amplitude of a signal to be transmitted via the differential transmission path,
   and wherein the control signal includes data for controlling the amplitude.

3. The bidirectional transmission system according to claim 1, wherein the first driver is structured to have a pre-emphasis function, and to be capable of adjusting at least one from among a pre-emphasis value and a waveform,
   and wherein the control signal includes data for controlling the pre-emphasis function.

4. The bidirectional transmission system according to claim 1, wherein the first driver is structured to have a de-emphasis function, and to be capable of adjusting at least one from among a de-emphasis value and a waveform,
   and wherein the control signal includes data for controlling the de-emphasis function.

5. The bidirectional transmission system according to claim 1, wherein the second receiver is structured to have an equalization function,
   and wherein the automatic adjustment circuit adjusts the equalization function of the second receiver so as to reduce an error rate of the first serial data.

6. The bidirectional transmission system according to claim 5, wherein, after the equalization function is adjusted, the automatic adjustment circuit adjusts the operation parameter of the first driver of the first circuit according to the control signal.

7. The bidirectional transmission system according to claim 1, wherein the first serial data is encoded by means of the first circuit with a predetermined method,
   and wherein, when the received first serial data does not match any valid symbol, the automatic adjustment circuit judges this as an error.

8. The bidirectional transmission system according to claim 7, wherein the predetermined method is 8b/10b encoding.

9. A serializer circuit coupled to a deserializer circuit via a differential transmission path so as to form a bidirectional transmission system, wherein the deserializer circuit comprises:
   a second receiver coupled to one end of the differential transmission path, and structured to receive first serial data transmitted from the serializer circuit;
   an automatic adjustment circuit structured to generate a control signal so as to reduce an error rate of the first serial data received by the second receiver; and
   a second driver coupled to the one end of the differential transmission path, and structured to drive the differential transmission path according to second serial data including the control signal,
   wherein the serializer circuit comprises:
   a first driver coupled to the other end of the differential transmission path, and structured to drive the differential transmission path according to the first serial data;
   a first receiver coupled to the other end of the differential transmission path, and structured to receive the second serial data transmitted from the deserializer circuit; and
   a controller structured to set an operation parameter of the first driver based on the control signal included in the second serial data.

10. The serializer circuit according to claim 9, wherein the first driver is structured to adjust an amplitude of a signal to be transmitted via the differential transmission path,
    and wherein the control signal includes data for controlling the amplitude.

11. The serializer circuit according to claim 9, wherein the first driver is structured to have a pre-emphasis function, and to be capable of adjusting at least one from among a pre-emphasis value and a waveform,
    and wherein the control signal includes data for controlling the pre-emphasis function.

12. The serializer circuit according to claim 9, wherein the first driver is structured to have a de-emphasis function, and to be capable of adjusting at least one from among a de-emphasis value and a waveform,
    and wherein the control signal includes data for controlling the de-emphasis function.

13. A deserializer circuit coupled to a serializer circuit via a differential transmission path so as to form a bidirectional transmission system,
    wherein the serializer circuit comprises:
    a first driver coupled to one end of the differential transmission path, and structured to drive the differential transmission path according to first serial data;
    a first receiver coupled to the one end of the differential transmission path, and structured to receive second serial data transmitted from the deserializer circuit; and
    a controller structured to set an operation parameter of the first driver based on a control signal included in the second serial data,
    and wherein the deserializer circuit comprises:
    a second receiver coupled to the other end of the differential transmission path, and structured to receive the first serial data transmitted from the serializer circuit;

an automatic adjustment circuit structured to generate a control signal so as to reduce an error rate of the first serial data received by the second receiver; and a second driver coupled to the other end of the differential transmission path, and structured to drive the differential transmission path according to the second serial data including the control signal.

14. The deserializer circuit according to claim 13, wherein the second receiver is structured to have an equalization function, and wherein the automatic adjustment circuit adjusts the equalization function of the second receiver so as to reduce an error rate of the first serial data.

15. The deserializer circuit according to claim 14, wherein, after the equalization function is adjusted, the automatic adjustment circuit adjusts the operation parameter of the first driver of the serializer circuit according to the control signal.

16. The deserializer circuit according to claim 13, wherein the first serial data is encoded by means of the serializer circuit with a predetermined method, and wherein, when the received first serial data does not match any valid symbol, the automatic adjustment circuit judges this as an error.

17. The deserializer circuit according to claim 16, wherein the predetermined method is 8b/10b encoding.

18. A vehicle comprising:

a camera;

a processor; and a bidirectional transmission system according to claim 1, provided between the camera and the processor.

* * * * *